US008146457B2

(12) United States Patent
Wright

(10) Patent No.: US 8,146,457 B2
(45) Date of Patent: Apr. 3, 2012

(54) DISK PENDULUM VIBRATION DAMPER

(75) Inventor: Duncan Ross Wright, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 922 days.

(21) Appl. No.: 12/019,263

(22) Filed: Jan. 24, 2008

(65) Prior Publication Data

US 2009/0188463 A1    Jul. 30, 2009

(51) Int. Cl.
*F16F 15/14*    (2006.01)
(52) U.S. Cl. ............... 74/574.2; 74/574.3; 74/572.2; 74/572.21
(58) Field of Classification Search .......... 74/572.2, 74/574.2, 574.3, 604, 572.21; 123/192.1, 123/192.2, 198 F; 464/180, 89; *F16F 15/14*
See application file for complete search history.

(56) References Cited

U.S. PATENT DOCUMENTS

| | | | | |
|---|---|---|---|---|
| 1,085,443 A | * | 1/1914 | Lanchester | 74/572.2 |
| RE15,645 E | * | 7/1923 | Tibbetts | 74/574.2 |
| 1,627,917 A | * | 5/1927 | Masury | 74/574.3 |
| 1,718,208 A | * | 6/1929 | Anibal | 74/574.2 |
| 1,844,991 A | * | 2/1932 | Thomas | 74/574.2 |
| 1,884,480 A | * | 10/1932 | Woolson | 440/52 |
| 2,346,972 A | * | 4/1944 | Kishline | 74/574.2 |
| 2,880,599 A | * | 4/1959 | Hlinsky | 464/89 |
| 4,739,679 A | | 4/1988 | Berger et al. | |
| 5,976,020 A | * | 11/1999 | Lohaus et al. | 464/3 |
| 6,026,776 A | | 2/2000 | Winberg | |

OTHER PUBLICATIONS

"Eliminating Crankshaft Torsional Vibration in Radial Aircraft Engines" by E.S. Taylor, Massachusetts Institute of Technology, Mar. 1936, pp. 81-89.

* cited by examiner

*Primary Examiner* — James Pilkington
*Assistant Examiner* — Thomas Diaz
(74) *Attorney, Agent, or Firm* — Ralph E. Smith

(57) ABSTRACT

An apparatus for damping torsional vibration in a shaft, having a plurality of retainer pockets spaced from each other in the direction of the shaft's axis of rotation and connected for contemporaneous rotation with the shaft, and a plurality of disks each disposed within one of the retainer pockets, each retainer pocket having a circular track wall, each disk being free to shift perpendicular to the shaft's axis of rotation to engage and move along the circular track wall in response to the vibration, wherein each circular retainer pocket has a center that is at a predetermined radial offset distance relative to the shaft's axis of rotation and the respective radial offsets are angularly spaced from each other about the shaft's axis of rotation.

20 Claims, 5 Drawing Sheets

FIG - 6
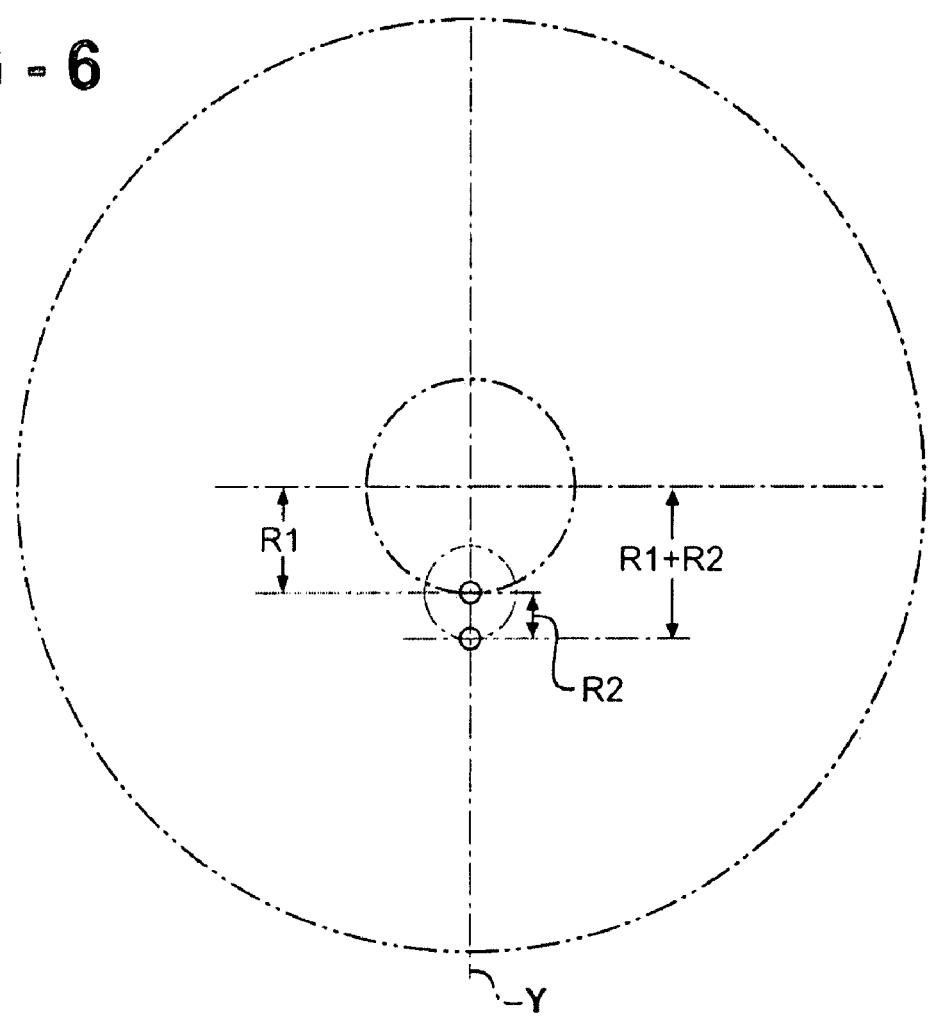
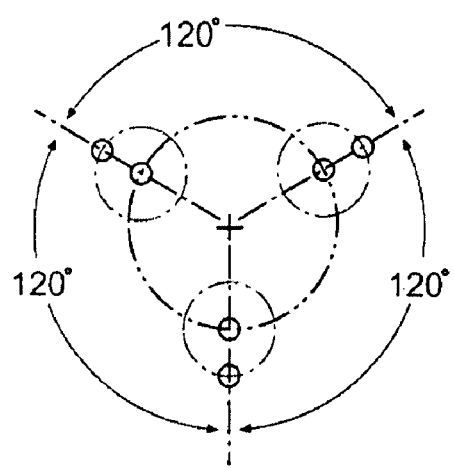
FIG - 7

DISK PENDULUM VIBRATION DAMPER

FIELD OF THE INVENTION

The present invention relates to a torsional vibration damper, and, more particularly, to a torsional vibration pendulum damper for an internal combustion engine crankshaft.

BACKGROUND OF THE INVENTION

In a typical reciprocating internal combustion engine useful work is performed by combustion-generated expanding gases acting on a piston inside a cylinder, which, by causing movement of the engine's solid parts, imparts rotational motion to the engine's crankshaft. In multi-cylinder internal combustion engines a crankshaft's rotational motion is generated by discrete periodic power stroke pulses from individual cylinders. Superimposed on the crankshaft's rotation is an oscillatory or back-and-forth motion associated with periodic cylinder firings during a power stroke pulse of each cylinder, as such, the crankshaft's rotation is typically not absolutely smooth. Such oscillatory motion, i.e. torsional vibration, may be detrimental not only to a perceived smoothness of an engine, but, by possibly disturbing valve event timing, may also negatively affect an engine's performance. Various design dampers have been used to quell such vibrations.

Pendulum dampers that incorporate small masses of varying size to absorb and release vibrational energy antiphase with crankshaft vibration and impulse are known in the industry. The basic principle behind such designs is that as crankshaft rotational speed increases, energy is absorbed by a pendulum mass, but as the rotational speed decreases energy is released back into the crankshaft. Typical of such solutions is the use of heavy-metal inserts associated with a damping medium floating in smooth bores incorporated into crankshaft counterweights. In such a case the heavy-metal inserts surrounded by the damping medium achieve a damping effect in response to vibration energy transmitted by the crankshaft (See U.S. Pat. No. 6,026,776). One drawback of such solutions is the need for special fabrication and assembly of the subject crankshaft.

The present invention provides a torsional vibration damper that does not require internal damping medium and is suited for simple connection to a shaft which requires no special fabrication or assembly.

SUMMARY OF THE INVENTION

The present invention is an apparatus for damping torsional vibration in a shaft. The apparatus has a plurality of retainer pockets spaced from each other along the shaft's axis of rotation and connected for contemporaneous rotation with the shaft. The apparatus additionally has a plurality of disks where each disk is disposed within one of the retainer pockets. Each retainer pocket has a circular track wall, and each disk is free to shift perpendicular to the shaft's axis of rotation to engage and move along the circular track wall in response to the vibration. Each circular retainer pocket has a center that is at a predetermined radial offset distance relative to the shaft's axis of rotation and the respective radial offsets are angularly spaced from each other about the shaft's axis of rotation.

The apparatus may be attachable to the shaft via a central hub member extending through a central opening in each disk. Said apparatus may be used for damping torsional vibration in a crankshaft of a motor vehicle engine.

It should be understood that the detailed description and specific examples which follow, while indicating preferred embodiments of the invention, are intended for purposes of illustration only and are not intended to limit the scope of the invention.

BRIEF DESCRIPTION OF THE DRAWINGS

FIG. 6 is an enlarged view of a circular area C of the circular retainer pocket and circular weighted disk shown in FIG. 5 providing details of a relationship between a crankshaft rotation axis, center of a circular retainer pocket, and a center of the circular retainer pocket's respective weighted disk according to the invention.

FIG. 7 is a schematic view illustrating the relationship and spacing of three retainer pockets and centers of three circular weighted disks in a disk pendulum vibration damper for a three cylinder engine according to the invention.

DETAILED DESCRIPTION

In general the present invention is directed to a torsional vibration pendulum damper, i.e. absorber, for an internal combustion engine crankshaft. The invention may be employed with an internal combustion engine that operates with a fixed displacement, i.e. where the functioning number of cylinders is fixed, or with variable displacement. Typically the amount of an engine's functioning displacement is varied, i.e. decreased, in an effort to reduce an engine's fuel consumption by disabling the valves associated with at least one cylinder. Because, for example, a six-cylinder engine may derive sufficient power for idle or low load operation from just three of its cylinders, deactivation of three cylinders during such modes of operation is likely to reduce the engine's fuel consumption. An engine's operation on three cylinders, however, produces more vibration than in the six cylinder mode, and may therefore require supplementary damping to improve its smoothness. In the embodiment described herein the vibration absorber will be described in relation to a three cylinder engine or a three cylinder operating mode of a six-cylinder engine. It will be appreciated, however, that the invention may also be used with engines having a different number of cylinders through adjustments as will be described below.

Figure 1:
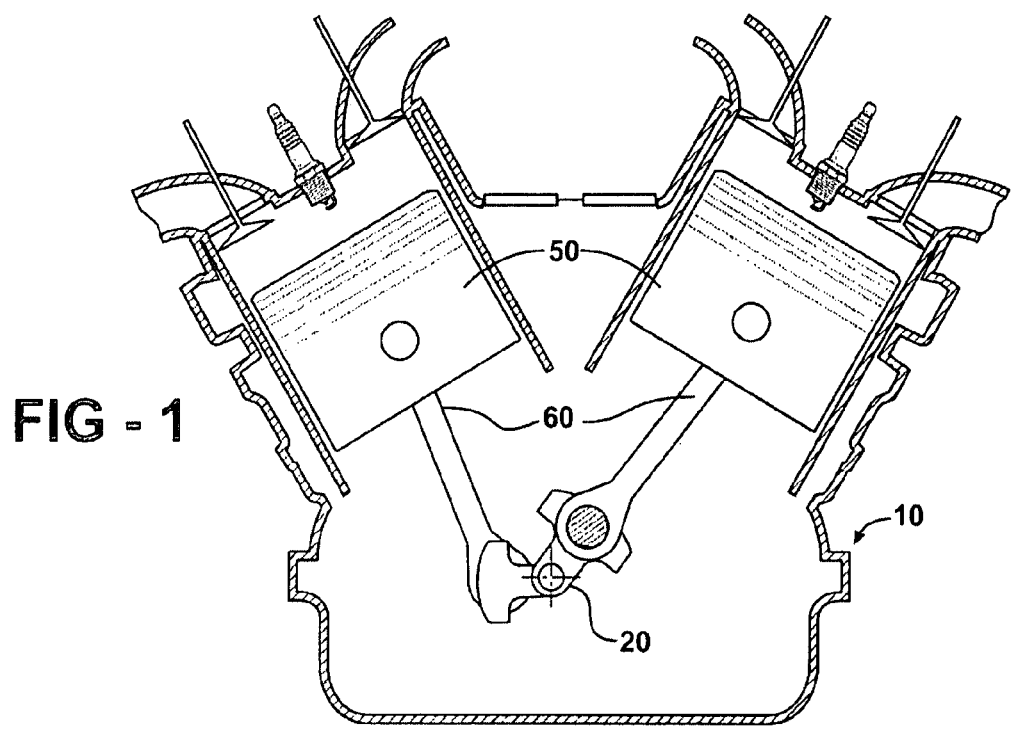
FIG. 1 is a schematic cross-sectional view of a typical multi-cylinder motor vehicle internal combustion engine.
Figure 2:
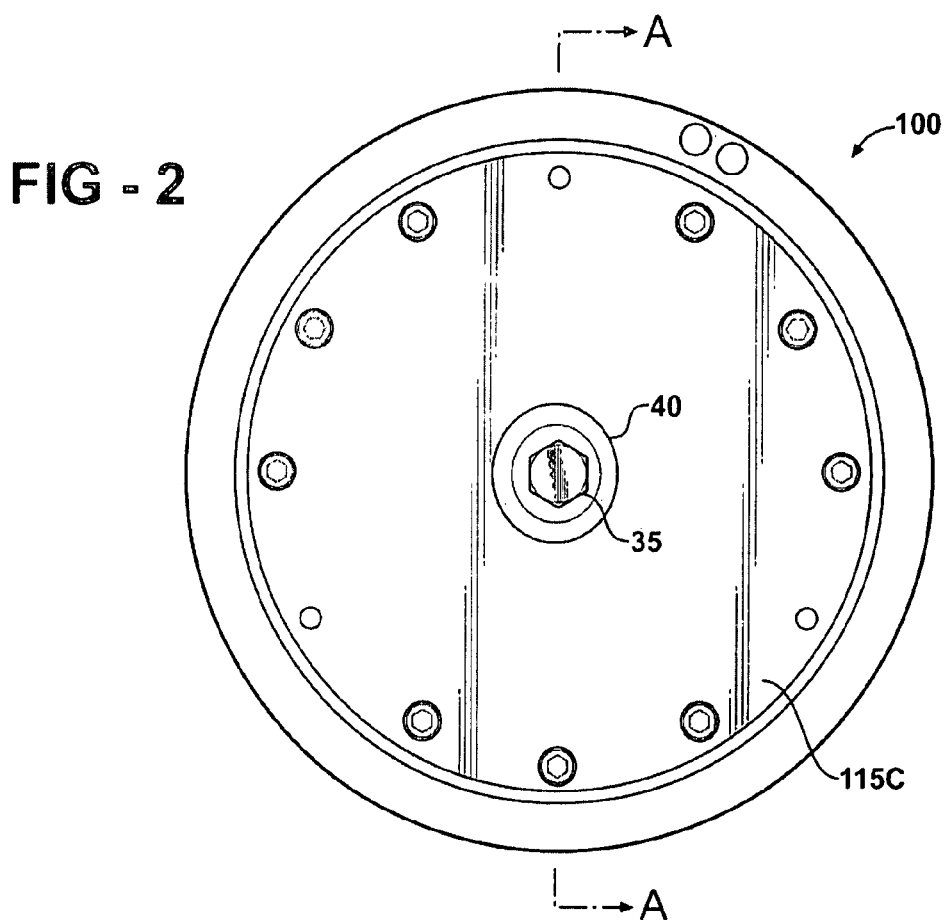
FIG. 2 is an elevational view of a disk pendulum vibration damper according to the invention.
Figure 3:
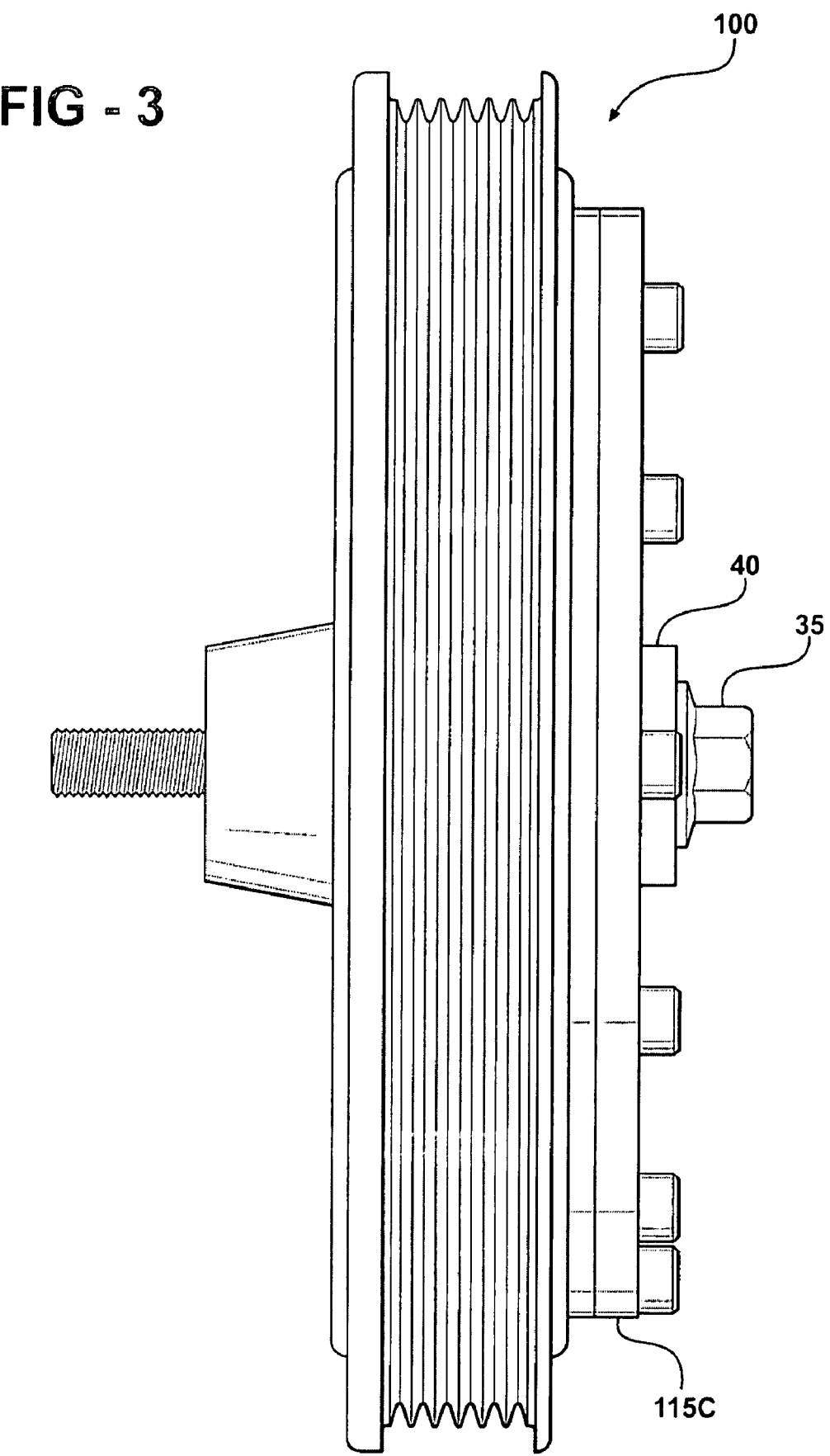
FIG. 3 is a side view the disk pendulum vibration damper according to the invention.

Referring now to the drawings in which like elements of the invention are identified with identical reference numerals throughout, FIG. 1 denotes a schematic cross-sectional view of a typical multi-cylinder motor vehicle engine 10. Engine 10 has a crankshaft 20 which is rotationally driven by power stroke pulses produced by reciprocating pistons 50 via connecting rods 60. FIG. 2 shows a front view, while FIG. 3 shows a side view of vibration damping apparatus 100 in accordance with the invention. Crankshaft's terminal end 25 includes threaded recess 30 for receiving complementary threaded fastener 35 with spacer or lock washer 40 for connecting vibration damping apparatus 100 to crankshaft 20 for their contemporaneous rotation (shown in FIG. 4).

Vibration damping apparatus 100 is comprised of a plurality of weighted disks acting as pendulums and located within respective circular retainer pockets that rotate with the crankshaft. Each disk has a disk face, and the circular retainer pockets are spaced from each other along crankshaft rotation axis 120 and the disk faces are parallel to each other. The disks are preferably, but need not be, identical nor be provided with flat faces as shown in the embodiments herein. Each of the circular retainer pockets may be comprised of a one-piece molded object of an upstanding circular wall and an annular retaining wall.

Figure 4:
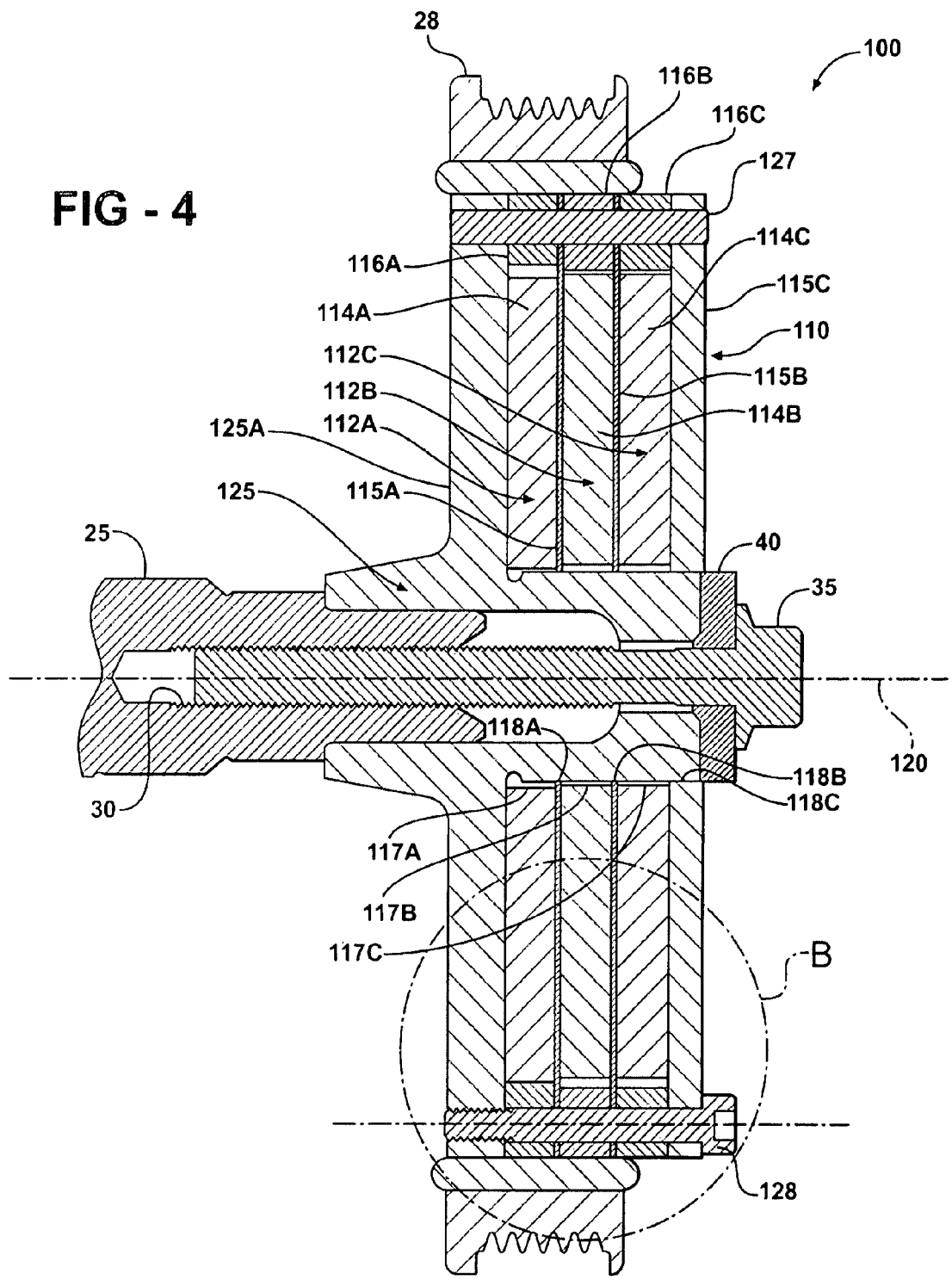
FIG. 4 is a cross-sectional view of the disk pendulum vibration damper according to the invention taken along line A-A of FIG. 2.

Damping apparatus 100 shown in FIG. 4 includes three parallel vertically upstanding circular weighted disks 112A, 112B and 112C. Each disk resides within a respective circular retainer pocket 114A, 114B and 114C. Circular weighted disk 112C is located within circular pocket 114C which is comprised of circular vertically upstanding cover wall 115C and annular spacer insert 116C. Circular pocket 114B within which weighted disk 112B resides is comprised of vertically upstanding circular isolation wall 115B and annular spacer insert 116B. Circular pocket 114A within which weighted disk 112A resides is comprised of vertically upstanding circular isolation wall 115A and annular spacer insert 116A. Each weighted disk 112A, 112B and 112C has a respective circular opening 117A, 117B and 117C, and each vertically upstanding cover wall 115A, 115E and 115C has a respective circular opening 118A, 118B and 118C. Damper hub 125 supports circular pockets 114A, 114B and 114C and weighted disks 112A, 112B and 112C by extending through circular openings 117A, 117B and 117C, and through circular openings 118A, 118B and 118C. Damper hub 125 includes vertically upstanding circular cover wall 125A which closes one end of circular retainer pocket 114A within which weighted disk 112A resides.

As shown in FIG. 4, two adjacent circular vertically upstanding cover walls trap each weighted disk between them allowing only rotational and perpendicular movement of each disk relative to crankshaft rotation axis 120. As additionally shown in FIG. 4, outer surface of vibration damping apparatus 100 may comprise pulley 28, such as one typically used to drive via a belt (not shown) an engine accessory, e.g. an alternator or a power steering pump. Circular pockets 114A, 114B and 114C are coupled to damper hub 125 with circular cross-section pins 127. Pins 127 fit within respective apertures in each of the isolation walls 115A, 115B, cover wall 115C, annular spacer inserts 116A, 116B, 116C and damper hub cover wall 125A.

Each circular weighted disk may have its outer edges slide relative to the respective circular pocket, engage and travel along the annular pocket wall, and rotate about the weighted disk's axis. The aforementioned disk's travel along the pocket wall may affect an oscillatory movement in opposition to the superimposed oscillations upon the crankshaft rotation in response to engine power stroke pulses. Each circular weighted disk may further shift relative to crankshaft rotation axis 120 to offset first order imbalances of crankshaft 20, i.e. crankshaft center of mass imbalances from the crankshaft rotation axis. The edge of each circular disk engaging the annular pocket wall may be tapered or rounded instead of the squared shape shown in FIG. 4. As noted above, the invention is useful for reducing vibrations in engines having more or less than three cylinders. The total number of circular pockets and corresponding weighted disks, each residing in a respective circular pocket, may be different than the three such pockets and disks described herein as an example.

Figure 5:
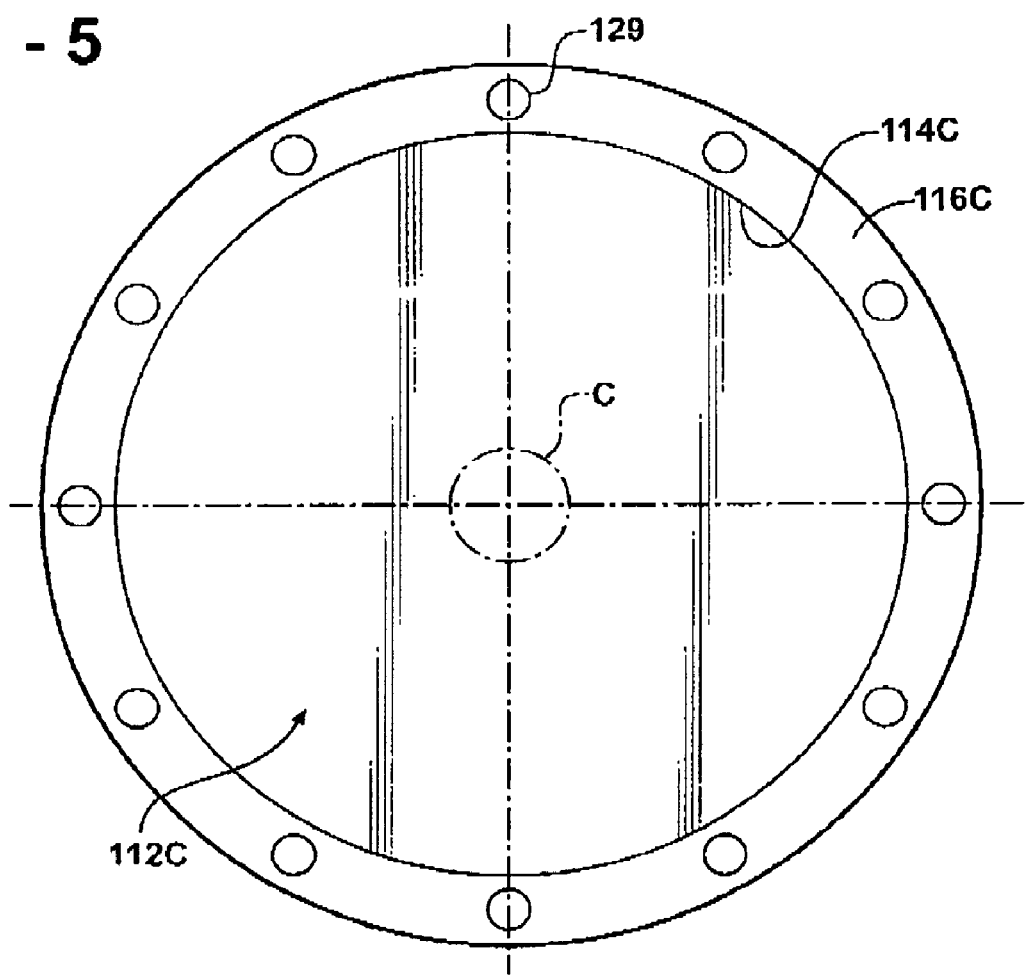
FIG. 5 is an elevational view of a circular retainer pocket and a circular weighted disk within the pocket showing a constituent portion of the disk pendulum vibration damper according to the invention.

Circular pockets 114A. 114B and 114C are mounted to damper hub 125 so that they are not coaxial with crankshaft rotation axis 120. This may be particularly seen in the circular area B shown in FIG. 4 and will be explained with further reference to FIGS. 6 and 7. FIG. 5 illustrates a circular weighted disk, for example weighted disk 112C received within pocket 114C. The diameter of the disk in FIG. 5, which comprises the largest disk face dimension, is shown substantially the same as that of the annular recesses provided by the spacer insert. In actuality, this disk dimension will be slightly smaller, as will be described hereinafter, to allow movement of the weighted disk relative to its circular pocket. FIG. 6 shows enlarged schematic view of circular central area C of the circular retainer pocket and the circular weighted disk shown in FIG. 5. FIG. 6 is provided to show the relationship between crankshaft rotation axis 120, the center of a circular pocket, and the center of its respective weighted disk. This relationship is similar to that of the other circular pockets with their respective weighted disks. The center of a circular pocket, which defines a circular pocket wall, is offset from crankshaft rotation axis 120 by distance R1. The center of the respective weighted disk, when the disk engages the circular pocket wall, is further offset from crankshaft rotation axis 120 and from the center of the respective pocket along radial line Y by distance R2. Both the circular pocket and the weighted disk have openings in the respective centers thereof through which the damper hub 125 extends. Distances R1 and R2 are calculated heuristically based on the number of functioning cylinders N in a subject engine per the mathematical relationship $R1/R2=(N/2)^2$. The offsets of circular pockets' and of their respective weighted disks' centers are thus determined to most effectively absorb a particular engine's crankshaft vibration.

With reference now to FIG. 7 there is shown a schematic of the relationship between crankshaft rotation axis 120, the centers of the circular pockets, and the respective centers of the weighted disks. It will be noted from this view that the centers of each of the respective circular pockets are equidistant in a small offset from crankshaft rotation axis 120. However, in the case of damping apparatus 100 for a three cylinder engine there are three circular pockets, and the respective centers of the pockets are angularly equally spaced from each other about crankshaft rotation axis 120 by 120°.

Apertures of the respective isolation walls 115A, 115B, cover wall 115C and damper hub cover wall 125A may be spaced uniformly relative to crankshaft rotation axis 120. Apertures 129 (shown in FIG. 5) in annular spacer inserts 116A, 116B, 116C, however, may be spaced non-uniformly relative to said axis in order to achieve the desired small offset of the center of the respective pocket relative to crankshaft rotation axis 120. For expediency each pocket may be identical to other pockets and each disk may be identical to other discs utilized in vibration damping apparatus 100. Each pocket, assuming they are identical, may be mounted with dowel pins 127 and screws 128 through rotation of 120° to achieve the 120° spacing of each pocket relative to an adjacent one, and to obtain the small offset in each pocket relative to crankshaft rotation axis 120.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for damping torsional vibration in a shaft, the apparatus comprising:
 a plurality of retainer pockets spaced from each other along the shaft's an axis of rotation of the shaft and connected for contemporaneous rotation with the shaft; and
 a plurality of disks each disposed within one of the retainer pockets, each retainer pocket having a circular track wall and a central aperture through which the axis of rotation of the shaft extends, each disk being free to shift perpendicular to the axis of rotation of the shaft to engage and move along the circular track wall in response to the vibration;
 wherein each circular retainer pocket has a center that is at a predetermined radial offset distance relative to the axis of rotation of the shaft and the respective radial offsets are angularly spaced from each other about the axis of rotation of the shaft.

2. The apparatus of claim 1 wherein the radial offset distances for each circular retainer pocket are substantially equal to each other.

3. The apparatus of claim 2 wherein the plurality is three and the radial offsets are angularly spaced from each other by 120 degrees.

4. The apparatus of claim 3 wherein the shaft is a crankshaft of a multiple cylinder engine.

5. The apparatus of claim 4 wherein the number of firing cylinders in the engine is three.

6. The apparatus of claim 3 wherein the three disks are identical and the three circular retainer pockets are identical.

7. The apparatus of claim 1 further comprising a hub member extending through the central opening of each disk.

8. The apparatus of claim 7 wherein the hub member comprises a structure attachable to the shaft.

9. The apparatus of claim 1 wherein each disk rotates as it moves along the circular track wall.

10. The apparatus of claim 1 wherein as the disk engages the circular track wall the disk center is displaced from the center of the circular retainer pocket.

11. An apparatus for damping torsional vibration in a crankshaft, the apparatus comprising:
 a plurality of retainer pockets spaced from each other along the axis of rotation of the crankshaft and connected for contemporaneous rotation with the crankshaft, each of the plurality of retainer pockets encircling the axis of rotation of the crankshaft; and
 a plurality of disks each disposed within one of the retainer pockets, each retainer pocket having a circular track wall, each disk being free to shift perpendicular to the axis of rotation of the crankshaft to engage and move along the circular track wall in response to the vibration;
 wherein each circular retainer pocket has a center that is at a predetermined radial offset distance relative to the axis of rotation of the crankshaft and the respective radial offsets are angularly spaced from each other about the axis of rotation of the crankshaft.

12. The apparatus of claim 11 wherein the radial offset distances for each circular retainer pocket are substantially equal to each other.

13. The apparatus of claim 12 wherein the plurality is three and the radial offsets are angularly spaced from each other by 120 degrees.

14. The apparatus of claim 13 wherein the crankshaft is a part of an engine having three firing cylinders during operation in a reduced capacity mode.

15. The apparatus of claim 13 wherein the three disks are identical and the three circular retainer pockets are substantially identical.

16. The apparatus of claim 11 further comprising a hub member extending through a central opening of each disk and having a structure attachable to the crankshaft.

17. The apparatus of claim 11 wherein each disk rotates as it moves along the circular track wall and as the disk engages the circular track wall the disk center is displaced from the center of the circular retainer pocket.

18. The apparatus of claim 11 wherein its outer surface comprises a pulley.

19. An apparatus comprising:
 a crankshaft having an axis of rotation; and
 a damping device including a plurality of annular pockets and a plurality of annular disks movably disposed within the plurality of annular pockets, each of the plurality of annular pockets extending angularly three-hundred-sixty degrees around the axis of rotation, wherein centers of the plurality of annular pockets are offset from the axis of rotation, and wherein the centers of the plurality of annular disks are offset from the axis of rotation and the centers of the plurality of annular pockets.

20. The apparatus of claim 19, wherein the crankshaft is a part of an engine having a first quantity of cylinders that are active during operation of the engine in a fuel-economy mode and a second quantity of cylinders that are active during operation of the engine in a full-capacity mode, and wherein a quantity of the annular disks is equal to the first quantity of active cylinders.

* * * * *